Dec. 13, 1927.

C. R. SODERBERG 1,652,502

BALANCING MACHINE

Filed Dec. 21, 1922

WITNESSES:

INVENTOR
Carl Richard Soderberg
BY
ATTORNEY

Patented Dec. 13, 1927.

1,652,502

UNITED STATES PATENT OFFICE.

CARL RICHARD SODERBERG, OF EDGEWOOD PARK, PENNSYLVANIA, ASSIGNOR TO WESTINGHOUSE ELECTRIC & MANUFACTURING COMPANY, A CORPORATION OF PENNSYLVANIA.

BALANCING MACHINE.

Application filed December 21, 1922. Serial No. 608,372.

My invention relates to balancing machines, more especially to machines adapted to indicate the degree of unbalance of a rotatable body to be balanced.

It is among the objects of this invention to provide a device of the above-designated character which shall be adapted to indicate the amount and relative location of unbalance of a rotatable body in a simple and reliable manner.

It is a further object of this invention to provide a device which shall be of simple construction, inexpensive to manufacture and adapted to test rotors for the correction of unbalanced mass in a relatively short period of time.

In my copending application, Serial No. 593,732, filed Oct. 11, 1922, I have described a balance-testing device which is adapted to test very small high-speed bodies having low degrees of unbalance, which consists of a stationary support having a vertically oscillatable bed and a movable fulcrum disposed between the bed and the support.

This device is adapted to indicate the degree of unbalance of a rotating body mounted upon the bed about any transverse axis in a given horizontal plane. The bed is also supported by a plurality of spring members and the amplitude of vibration which is effected by the centrifugal forces of the unbalanced masses is registered by an indicator.

My present invention is directed to an improvement in the above-mentioned device which will readily locate the angular position on the face of the rotor in which suitable correction weights are to be applied to counteract the unbalanced mass of the rotor. By means of such a device, the operator will be enabled to mark the rotor in the exact position where such correction weights are to be located, thereby greatly increasing the efficiency of the device and the speed at which a dynamic balance test may be made.

In the accompanying drawing constituting a part hereof and in which like reference characters designate like parts, Figure 1 is a side elevational view of a balancing machine embodying the principles of this invention;

Figure 1:
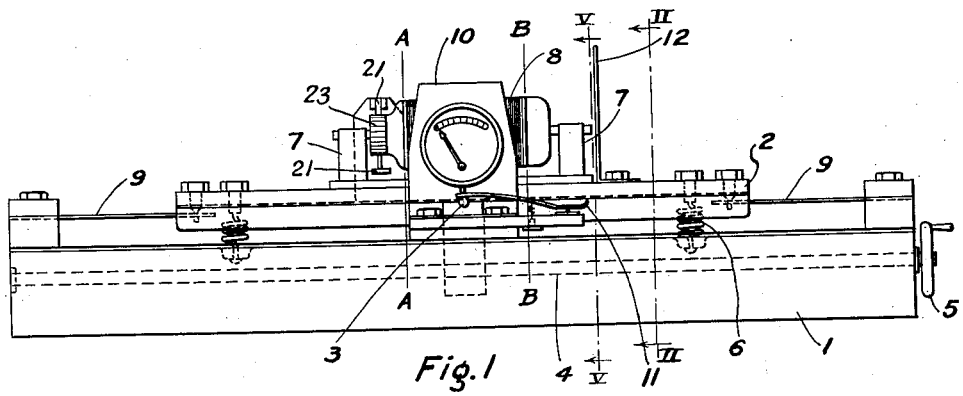
Figure 2:
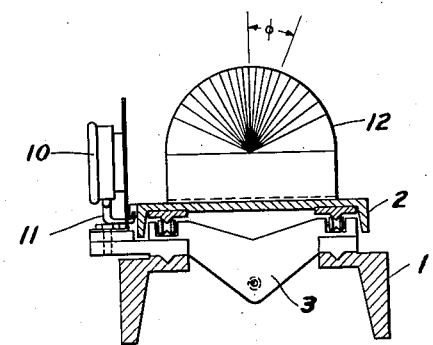
Fig. 2 is a cross-sectional view thereof, partially in elevation, taken along the lines 2—2 of Fig. 1.
Figure 3:
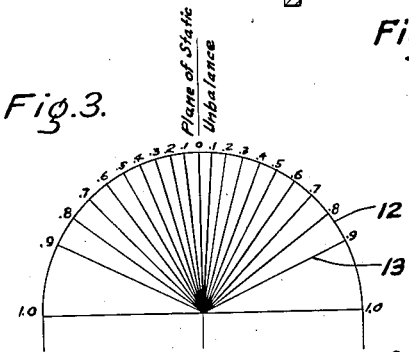
Fig. 3 is a front elevational view of a graduated gauge or indicator from which the location of the points of correction may readily be determined.
Figure 5:
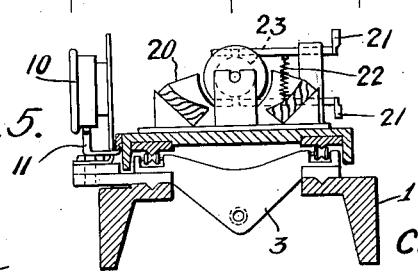
Fig. 5 is a view, in cross-section, of the device shown in Fig. 1, taken along the line V—V, Fig. 1.

Referring to Fig. 1, the device consists of a stationary support 1, a movable bed 2 and a horizontally movable fulcrum member 3, which is interposed between the bed 2 and support 1 and is movable relatively thereto by means of a manually-actuated screw 4 and hand wheel 5. The bed 2 is supported on the support 1 by a plurality of helical coil springs 6 and is further provided with a plurality of bearing blocks 7 adapted to rotatably mount a rotor 8. A pair of straps 9 are secured to the respective ends of the bed 2 to restrain lateral movement thereof. A pair of stationary field coils 20, Fig. 5 are mounted to the bed 2 on both sides of the rotor 8 in proximity thereto and constitute the energizing field of the electrical armature to be tested, which is the rotor 8. A pair of brush terminals 21, biased by a spring 22, are provided for the commutator 23 of the armature 8. An indicator 10 is attached to the fulcrum member 3 and is provided with a lever arm 11, one end of which engages the under side of the bed 2, and a graduated semi-circular sheet-metal plate 12 is attached to the bed 2 with its center in alinement with the horizontal axis of the rotor 8. The member 12 may be provided with a plurality of graduations 13 (Fig. 3) which may be marked in any suitable manner.

Figure 4:
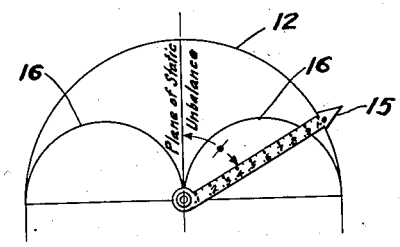
Fig. 4 is a modified form of the indicator shown in Fig. 3.

The modification shown in Fig. 4 consists of a pointer or indicator 15 movable around the center of the dial which corresponds to the axis of rotation of the rotor 8. The pointer 15 is graduated into ten equal parts, marked as shown.

Two semi-circles 16, having diameters equal to the radius of the semi-circular member 12, are marked thereon. The length of the radius vector in these semi-circles 16 is a direct measure of the sine of the angle determined from the readings and computations, as will be hereinafter set forth.

The body to be tested is mounted on a pair of knife edges to determine the location of static unbalance, which is marked on the light side of the rotor by a line extending from its respective faces. The rotor is then mounted upon the bearing blocks 7 and actuated by energizing the field coils. The speed of the rotor is adjusted to synchronize with the natural period of vibration of the bed 2. This condition of resonance is indicated by a sudden increase in the amplitude, indicated by the indicator 10. The fulcrum 3 is moved in either the vertical plane A—A or the plane B—B, and the amplitude indicated by the indicator 10 is a measure of the mass to be applied in the transverse plane opposite to that in which the fulcrum 3 is located. The mass to be applied in the transverse plane in which the fulcrum was located is determined by moving the fulcrum 3 in the plane for which the correction weight has been found, and the amplitude of the indicator, with the fulcrum in this position, is the measure of the mass to be applied in such transverse plane.

It is then necessary to locate the correction weights with reference to the static plane, which is the line marked on the rotor, more specifically, to determine the angle at which the weights are to be located from this line. These angles are obtained by comparison of the readings already recorded with a third reading, which is the minimum reading obtained by moving the fulcrum 3 along the rotor 8. The quotient of this minimum reading and the readings obtained for the fulcrum located in planes A—A and B—B represents the sine of the angle which determines the points of location for the correction masses with respect to the static plane.

It will be necessary to determine, by trial, on which side of the static line the correction weights are to be applied. The member 12 serves to facilitate the computation of these angles from the readings obtained and may be graduated in degrees or in natural sines. The angle thus calculated from the readings, when located on the member 12, will be the point at which the correction weights are to be applied on the rotor. Such points are located on the rotor by bringing the marked side indicating the light side of the static plane in alinement with the vertical or zero line of the member 12. The point on the rotor at which the correction is to be made is then located from the angle which may be marked or in any manner extended from the graduations of the member 12. For this purpose, an indicator 15 may be mounted thereon which is manually operated to fix the angle on the indicator after it has been calculated, as explained above.

The correction need not be made while the rotor is mounted in the machine, but simply marked thereon to expedite testing a large number of rotors in a short period of time.

It is evident, from the above description of my invention, that testing devices made in accordance therewith provide an efficient and expeditious means for testing small high-speed bodies, such as armatures for dynamo-electric machines, and that the indicating device for locating the angle at which the correction weights are to be applied facilitates the work of the operator and permits of greater activity by a single machine.

Although I have described a specific embodiment of my invention, it will be obvious to those skilled in the art that various modifications may be made in the details of construction without departing from the principles herein set forth.

I claim as my invention:

1. In a balancing machine, the combination of means for rotatably supporting a body to be tested, actuating means for effecting rotation of said body, means for permitting oscillatory motion of said body about a transverse axis in a given horizontal plane, means for indicating the amplitude of such movement, and means located on said machine for locating the point of unbalance effecting the movements.

2. In a balancing machine, the combination of means for rotatably supporting a body to be tested, actuating means for effecting rotation of said body, means for permitting oscillatory motion of said body about a transverse axis in a given horizontal plane, means for indicating the amplitude of such movement, and indicating means mounted on said machine for locating the relative position of the weights necessary to counterbalance the unbalanced mass in said body.

3. In a balancing machine, the combination of means for rotatably supporting a body to be tested, actuating means for effecting rotation of said body, means for permitting oscillatory motion of said body about a transverse axis in a given horizontal plane, means for indicating the amplitude of such movement, and indicating means mounted on said machine for locating the relative position of the weights necessary to counterbalance the unbalanced mass with respect to the light side of the static unbalance of said body.

4. In a balancing machine, the combination with a supporting frame, of a vertically oscillatable bed and a movable fulcrum interposed therebetween, means for indicating the degree of unbalance in a body to be tested, and means located on said bed for locating the angular position in which weights are to be applied to counteract the unbalance in said body.

5. In a balancing machine, the combination with a supporting frame, of a vertically oscillatable bed and a movable fulcrum interposed therebetween, means for indicating the degree of unbalance in a body to be tested, and means for indicating the angular position in which weights are to be applied to counteract the unbalance in said body, said indicating means comprising a graduated gauge mounted on said bed in alinement with the body to be tested.

6. In a balancing machine, the combination of means for rotatably supporting a body to be tested, actuating means for effecting rotation of said body, means for permitting oscillatory motion of said body about an axis at right angles to its axis of rotation, means for indicating the amplitude of such movement, and indicating means mounted on said machine for locating the position of the unbalanced mass relative to the plane of static unbalance of said body.

7. The method of dynamically balancing a rotatable body that comprises balancing the body statically and marking the plane of static unbalance thereon, mounting the body to rotate about its axis and to oscillate about an axis at right angles to its axis of rotation, measuring the amplitude of vibration of the body with the oscillation axis in a given transverse plane thereof, shifting the oscillation axis longitudinally of the body to determine the minimum amplitude obtainable, measuring the amplitude of vibration with the oscillation axis in a second transverse plane thereof, dividing the minimum amplitude reading by the amplitude reading obtained with the axis in each of said planes, and affixing a counterbalancing weight to the body being tested in each of the two selected transverse planes thereof, the weight to be affixed in each plane being proportional to the amplitude of vibration determined with the oscillation axis in the other plane and the position thereof with respect to the plane of static unbalance being determined by an angle whose sine is the quotient of the minimum reading and the reading of the amplitude obtained with the oscillation axis in the other plane.

In testimony whereof, I have hereunto subscribed my name this 13th day of December 1922.

CARL RICHARD SODERBERG.